: 2,729,634
Patented Jan. 3, 1956

2,729,634

SYNTHETIC STEROL ESTERS CONTAINING SULFUR

Frederick E. Dearborn, Washington, D. C.

No Drawing. Application June 26, 1951,
Serial No. 233,676

3 Claims. (Cl. 260—239.5)

(Granted under Title 35, U. S. Code (1952), sec. 266)

The invention herein described may be manufactured and used by or for the Government of the United States of America for governmental purposes throughout the world without the payment to me of any royalty thereon.

This invention relates to sterol esters containing chemically combined sulfur wherein the sulfur may be combined in the sterol radical, in the acid radical, or in both radicals, and has among its objects the provision of such esters for use in the formulation of pharmaceutical, cosmetic, and other preparations and of a process for preparing them.

It is well known that medicants applied to the unbroken skin may be absorbed into the blood stream and that the rate of absorption is influenced by the vehicle as well as the medicant that it contains. The sterol esters of this invention are readily absorbed by the skin, thus providing a novel means of introducing sulfur into the system to promote the growth of cutaneous tissues requiring sulfur for their normal growth. They also act as fungus inhibitors on the skin.

The sterols are a class of compounds of great importance to mankind, having a profound effect on human metabolism, and many are essential for our well being. They are monohydric alcohols, occurring both free and in the form of esters wherever the phenomena of life exists and play important roles in life processes. The sterols are divided into three general groups; the Zoosterols or those of animal origin, the Phytosterols or those of plant origin, and the Mycosterols or those of fungus origin. Both saturated and unsaturated sterols occur in nature, the latter however occurring in larger quantities. The unsaturated sterols contain from one to three double bonds in their molecule. Most, if not all, of the naturally occuring sterol esters are esters of the normal and isosaturated fatty acids.

I have found that compounds containing a double bond or bonds in their molecule may be made to chemically add sulfur to the double bond or bonds forming compounds which are saturated with respect to the carbon linkage, reference in this connection being made to my Patents No. 2,159,583, 2,169,793, 2,237,096, 2,333,-093, 2,427,717, and my co-pending patent application, Serial No. 233,675, filed June 26, 1951, entitled "Sulfurized Sterols"; Serial No. 23,677, filed June 26, 1951, entitled "Esters of Glycols and Sulfurized Fatty Acid"; and Serial No. 233,678, filed June 26, 1951, entitled "Compounds Containing Halogens Linked to Sulfur." The unsaturated sterols and the unsaturated fatty acids containing from one to three double bonds in their molecule respectively have been converted to saturated compounds by the addition of sulfur to the double bond or bonds. One atom of sulfur chemically adds to each double bond to satisfy the unsaturated carbon linkage, the sulfur adding to the double bond in the following manner to form a sulfurized double bond:

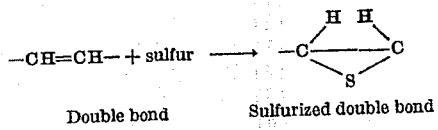

Double bond    Sulfurized double bond

A compound containing only one double bond can form only one sulfur compound, a compound containing two double bonds can form the mono- and the di- sulfur compounds, while a compound containing three double bonds can form the mono-, the di-, and the tri- sulfur compounds. In the process of sulfurization of a fatty acid or a sterol containing more than one double bond, the sulfur adds to the most reactive double bond first, then to the next more reactive bond and then to the least reactive double bond last. This has been pointed out, in the case of sterols, in my previously mentioned co-pending patent application, Serial No. 233,675, filed June 26, 1951, and entitled "Sulfurized Sterols," the double bond in the side chain being the most reactive, followed by the one next nearest to the side chain, and the one farthest from the side chain being the least reactive. For fatty acids, the double bond closest to the carboxyl radical (COOH) is the most reactive, and their reactivity diminishes the farther away they get. Due to this fact, selective sulfurization of both the sterols and the fatty acids containing more than one double bond in their respective molecules may be accomplished.

According to the invention, a sterol and an acid of the formula RCOOH wherein R is an organic radical, at least one of which contains at least one sulfurized double bond, are esterified, with or without a catalyst, and with removal of water formed, to produce a sulfur-containing sterol ester. The resulting ester may be represented by the general formula $$R(S)_a COOR'(S)_b$$

wherein R represents a dehydroxylated sterol radical which may be either saturated or unsaturated, R' represents an organic radical which may be either saturated or unsaturated, such as a hydrocarbon radical like alkenyl and alkyl, and $a$ and $b$ are integers ranging from zero to 3, either being at least 1 when the other is zero.

Since from 1 to 3 sulfurized double bonds may occur in either the sterol radical (R) or in the acid radical (R') in the above general formula, it is apparent that the formation of a wide variety of sulfur-containing sterol esters is possible. These are considered immediately hereafter, R and R' having the same values as given in the above general formula.

The simplest sulfur-containing sterol esters are those two, each of which contains only one atom of sulfur in its molecule, that is, in either the sterol or acid radical. These may be represented as follows:

(1) RSCOOR' (sulfurized sterol ester of a fatty acid)
(2) RCOOR'S (sterol ester of a sulfurized fatty acid)

Thus in (1) above, a sulfurized sterol may be combined with a saturated or unsaturated acid, while in (2) a saturated or unsaturated sterol may be combined with a sulfurized fatty acid.

In combining an unsaturated sterol with an unsaturated acid, both of which contain one double bond, the following three types of sterol esters are possible:

(1) RSCOOR'
(2) RCOOR'S
(3) RSCOOR'S

In combining an unsaturated sterol with an unsaturated acid, both of which contain two double bonds, the following eight types of sterol esters are possible:

(1) RCOOR'S
(2) RCOOR'$S_2$
(3) RSCOOR'
(4) R$S_2$COOR'
(5) RSCOOR'S
(6) RSCOOR'$S_2$
(7) R$S_2$COOR'S
(8) R$S_2$COOR'$S_2$

In combining an unsaturated sterol with an unsaturated acid, both of which contain three double bonds, the following fifteen types of sterol esters are possible:

(1) RCOOR'S
(2) RCOOR'$S_2$
(3) RCOOR'$S_3$
(4) RSCOOR'
(5) R$S_2$COOR'
(6) R$S_3$COOR'
(7) RSCOOR'S
(8) RSCOOR'$S_2$
(9) RSCOOR'$S_3$
(10) R$S_2$COOR'S
(11) R$S_2$COOR'$S_2$
(12) R$S_2$COOR'$S_3$
(13) R$S_3$COOR'S
(14) R$S_3$COOR'$S_2$
(15) R$S_3$COOR'$S_3$

The following sterols may be used in carrying out the invention although it is not limited to these particular compounds:

*Cholesterol.*—This sterol contains one double bond in the 5–6 position.

*7-dehydrocholesterol.*—This sterol contains two double bonds, one in the 5–6 position and the other in the 7–8 position. The double bond in the 7–8 position is more reactive than the one in the 5–6 position, hence when sulfurized with only enough sulfur to saturate it, the sulfur adds to the bond in the 7–8 position first, and when further sulfurized the sulfur adds to the bond in the 5–6 position.

*Lanosterol.*—This sterol contains two double bonds which are not conjugated. The most reactive double bond is in the side chain which adds sulfur first when sulfurized.

*Stigmasterol.*—This sterol contains two double bonds in its molecule.

*Dihydrocholesterol.*—This sterol is a saturated sterol, the double bond of cholesterol having been saturated with hydrogen.

*Dihydrolanosterol.*—This sterol contains one double bond as the double bond in the side chain of lanosterol has been saturated with hydrogen.

*Agnosterol.*—This sterol contains three double bonds, two of which are found in different rings but conjugated, while the third is found in the side chain. The most reactive bond is the one in the side chain. The next more reactive one is the one nearest the side chain.

*Dihydroagnosterol.*—This sterol contains two double bonds. It is prepared from agnosterol by saturating the double bond in the side chain with hydrogen.

*Sitosterol.*—This sterol contains one double bond in its molecule.

*Ergosterol.*—This sterol contains three double bonds in its molecule. It has approximately the same structure as cholesterol with one double bond in the 5–6 position, which is the least reactive, followed by one in the 7–8 position which is more reactive and one in the side chain which is the most reactive.

In sterols containing more than one double bond, the most reactive bond is in the side chain, followed by the one next nearest the side chain.

The fatty acids which may be used in this invention include the saturated as illustrated by the formula $$C_nH_{2n+1}COOH$$

and unsaturated acids as illustrated by the formulae $C_nH_{2n-3}COOH$ and $C_nH_{2n-5}COOH$, and may be represented by the general formula RCOOH wherein R is a hydrocarbon radical. Examples of such acids are the aliphatic monocarboxylic acids particularly the unsaturated higher fatty acids which are preferred, such as oleic acid containing one double bond generally in the 9–10 position in the chain, linoleic acid containing two double bonds, one in the 9–10 and the other in the 12–13 position in the chain, linolenic acid containing three double bonds in the following positions in the chain, namely 9, 12 and 15, the monobasic hydroxy aliphatic acids, both saturated and unsaturated, such as ricinoleic acid which is a hydroxy acid with one double bond in the 9–10 position, the phenolic acids such as salicylic and benzoic, and the higher saturated fatty acids, such as lauric, palmitic, stearic, and so forth.

The unsaturated sterols and the unsaturated monocarboxylic acids are sulfurized separately to the desired sulfur content before converting to the esters. Sterols and acids containing one double bond can add one atom (32 grams) of sulfur per mole of the sterol or acid, those containing two double bonds may add one or two atoms of sulfur (32 or 64 grams) per mole of sterol or acid, while those containing three double bonds may add one, two, or three atoms of sulfur (32, 64, or 96 grams) per mole. In other words 32 grams of sulfur may be added to each double bond per mole of pure sterol or acid to saturate the double bond.

The sulfurization process is carried out in a container not affected by sulfur at elevated temperatures. When the temperature of the sterol or acid has reached approximately 180° C. the required amount of sulfur, containing iodine as a catalyst, is slowly stirred in with continued heating. Iodine, in amounts equivalent to about 5% of the weight of flowers of sulfur, is mixed and ground together before adding to the hot acid or sterol to allow the iodine to combine with some of the sulfur, forming a sulfur-iodine compound. Agitation is maintained through the sulfurization process. When the temperature has reached 210° C. to 235° C., it is held there until the sulfur has combined chemically with the acid or sterol as shown by tests. The test for acids that are liquids at ordinary temperatures consists of removing a few drops of the hot material and dropping on a glass slide held in a slanting vertical position so that a thin film will form. If the film, on cooling is clear and transparent, the sulfur has chemically combined, but if it is cloudy or opaque uncombined sulfur is present requiring longer heating. For sterols and acids which are solids at ordinary temperatures, a different test must be made which consists of dissolving some of the hot sulfurized sterol or acid in a solvent, such as chloroform or carbon tetrachloride in which the sterol or acid is soluble but in which the sulfur is insoluble. If on cooling, no precipitate forms and the solution is clear, the sulfur has combined. To prevent any oxidation during the sulfurization process and subsequent cooling, the top of the molten mass may be blanketed with carbon dioxide or some other inert gas. Agitation is generally continued until the reacted mass has cooled or started to solidify.

Selective sulfurization of both the acids and sterols is accomplished by the difference in reactiveness of the double bonds when there are two or more present in the molecule. When there is only enough sulfur present to saturate one double bond, it adds to the most reactive bond first. When there is sufficient sulfur present to saturate two double bonds it adds to the two most reactive bonds, and when there is sufficient sulfur present to saturate three double bonds it finally adds to the third least reactive bond last. Due to the selective addition of sulfur to an acid or sterol containing more than one double bond, compounds such as the mono-, di-, and tri-sulfur compounds may be formed.

Esterification is brought about in the usual way when the acids have a boiling point below 100° C., but when the sterol and acid have boiling points above 100° C. esterification is accomplished by heating from about 110° to 190° C., with or without a catalyst. The hydroxyl (OH) group of the sterol unites with the hydrogen atom of the carboxyl group (COOH) of the acid to form the ester and water as shown by the general formula:

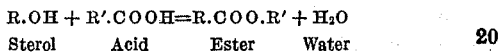
$$R.OH + R'.COOH = R.COO.R' + H_2O$$
Sterol    Acid    Ester    Water

The removal of the water formed is necessary for complete esterification. Substances that have a boiling point about 100° C. or below require a dehydrating agent or some other means to remove the water as it is formed. As the sterols and most of the higher carboxylic acids have boiling points above 100° C. it is only necessary to heat them above 100° C. to cause esterification, as the water is driven off at the higher temperature. The removal of the water is hastened by continuous agitation during the process of esterification, the higher the temperature the faster esterification progresses.

The sterols and acids should be in molecular proportions in the reaction, but it is better to have a slight excess of acid over the sterol as the removal of the excess acid is more easily accomplished than when there is an excess of sterol, due to the solubility of the acids in more solvents. The progress of esterification can be checked by determining the free acid in a sample taken from the reacting mixture. After esterification, any excess acid used, may be removed by washing with cold 95% ethyl alcohol as the esters are not appreciably soluble in cold alcohol.

The following examples are illustrative of the invention. Of these, Examples 1 to 11, inclusive, illustrate the production of esters of a sulfurized sterol and an acid, Examples 12 to 18, inclusive, illustrate the preparation of esters of a sterol and a sulfurized acid, and Examples 19 to 26, inclusive, demonstrate the preparation of esters of sulfurized sterols and sulfurized acids.

EXAMPLE 1

*Monosulfur cholesterol ricinoleate*

This compound is prepared by heating sulfurized cholesterol with ricinoleic acid in molecular proportions at a temperature ranging from 130° to 150° C. with agitation until esterification is completed. A light reddish yellow compound is obtained which has the consistency of butter. Any excess ricinoleic acid may be removed by washing with cold alcohol. The product is soluble in chloroform, hydrocarbons, animal and vegetable oils, and other solvents.

EXAMPLE 2

*Monosulfur cholesterol oleate*

This compound is prepared in a similar manner as in Example 1, above, using oleic acid in place of ricinoleic acid. The product which has a melting point of approximately 45° C. has characteristics similar to the product of Example 1.

EXAMPLE 3

*Monosulfur cholesterol laurate*

This compound is prepared in a similar manner as in Example 1, above, using lauric acid instead of ricinoleic acid. The product has a melting point of approximately 100° C., and is somewhat lighter in color than the oleate compound. It has approximately the same solubility characteristics.

EXAMPLE 4

*Monosulfur cholesterol palmitate*

This compound is prepared by heating sulfurized cholesterol and palmitic acid in molecular proportions at a temperature ranging from 130° C. to 170° C. until esterification is complete. Any excess palmitic acid may be removed by washing with a suitable solvent, such as cold isopropyl alcohol. The washed product has a melting point of approximately 105° C. and has a color similar to the laurate compound of Example 3.

EXAMPLE 5

*Monosulfur cholesterol salicylate*

This compound is prepared by heating sulfurized cholesterol with an excess of salicylic acid at a temperature of about 145° C. until esterification is complete, and any excess salicylic acid being removed by washing with cold alcohol. The washed product has a melting point of about 145° C.

EXAMPLE 6

*Monosulfur ergosterol palmitate*

This compound is prepared by heating monosulfur ergosterol with palmitic acid in molecular proportions at a temperature ranging from 130 to 170° C. until esterification is complete. Any excess palmitic acid is removed by washing the compound with isopropyl alcohol. The compound has a melting point of approximately 103° C. and has a light yellowish red color.

EXAMPLE 7

*Disulfur ergosterol palmitate*

This compound is prepared in a similar manner as in Example 6, above, with the exception that disulfur ergosterol is used in place of the mono-form. The compound has a melting point of approximately 105° C. and it is slightly darker in color than the product of Example 6, above.

EXAMPLE 8

*Trisulfur ergosterol benzoate*

This compound is prepared by heating trisulfur ergosterol with an excess of benzoic acid at a temperature ranging from 125° to 150° C. until esterification is complete, any excess acid being removed by washing with alcohol. It has a melting point of approximately 155° C. and is a darker colored compound than that obtained in Example 7, above.

EXAMPLE 9

*Monosulfur sitosterol oleate*

This compound is prepared by heating in molecular proportions monosulfur sitosterol and oleic acid at a temperature ranging from 130° to 170° C. until esterification is complete. It has a light yellowish red color and a consistency of soft butter.

EXAMPLE 10

*Monosulfur lanosterol stearate*

This compound is prepared by heating in molecular proportions monosulfur lanosterol and stearic acid at a temperature ranging from 125° to 150° C., any excess stearic acid being removed by washing with alcohol. It has a melting point of aproximately 114° C. and is a reddish yellow colored product.

EXAMPLE 11

*Disulfur lanosterol salicylate*

This compound is prepared by heating disulfur lanosterol with an excess of salicylic acid at a temperature ranging from 130° to 145° C. until esterification is complete. It has a melting point of approximately 136° C. and is a reddish yellow colored product.

EXAMPLE 12

*Cholesterol monosulfur oleate*

This compound is prepared by heating in molecular proportions cholesterol and sulfurized oleic acid at a temperature ranging from 130° to 150° C. until esterification is complete, any excess acid being removed by washing with alcohol. This compound has a melting point of about 46° C. and is of a light reddish yellow color.

EXAMPLE 13

*Lanosterol monosulfur ricinoleate*

This compound is prepared by heating lanosterol and sulfurized ricinoleic acid in molecular proportions at a temperature ranging from 130° to 150° C. It has a consistency of soft butter, and is a yellowish red product.

EXAMPLE 14

*Agnosterol monosulfur linoleate*

This compound is prepared in a similar manner as in Example 13, using agnosterol and monosulfur linoleic acid in place of the lanosterol and sulfurized ricinoleic acid of that example. The product has about the same color and consistency as the product of Example 13.

EXAMPLE 15

*Dihydroagnosterol disulfur linoleate*

This compound is prepared by reacting dihydroagnosterol and disulfur linoleic acid in molecular proportions at a temperature ranging from 130° to 170° C. It has the consistency of butter and is of a yellowish red color.

EXAMPLE 16

*7-dehydrocholesterol monosulfur linolenate*

This compound is prepared by reacting 7-dehydrocholesterol and monosulfur linoleic acid in molecular proportions at a temperature ranging from 130° to 150° C. until esterification is complete. It has the consistency of butter and is of a reddish yellow color.

EXAMPLE 17

*Ergosterol disulfur linolenate*

This compound is prepared in a similar manner as in Example 16, above, using ergosterol and disulfurized linoleic acid in place of the 7-dehydrocholesterol and monosulfur linolenic acid of that example. The product is of a slightly deeper reddish yellow color than that obtained in Example 16, above and a little firmer in consistency.

EXAMPLE 18

*Sitosterol trisulfur linolenate*

This compound is prepared by heating sitosterol and trisulfur linolenic acid in molecular proportions until esterification is complete. It has the consistency of hard butter and is of a deeper color than the compound obtained in Example 17, above.

EXAMPLE 19

*Monosulfur cholesterol monsulfur oleate*

This compound is prepared by reacting sulfurized cholesterol with sulfurized oleic acid in molecular proportions at a temperature ranging from 130° to 170° C. until esterification is complete. It has a melting point of about 48° C., and is slightly darker in color than the compound obtained in Example 12.

EXAMPLE 20

*Monosulfur lanosterol monosulfur linoleate*

This compound is prepared in a similar manner as in Example 19, above, using monosulfur lanosterol and monosulfur linoleic acid in place of the sulfurized cholesterol and sulfurized oleic acid of that example. The product has the consistency of butter and has about the same color as the product of Example 19.

EXAMPLE 21

*Disulfur lanosterol disulfur linoleate*

This compound is prepared by reacting disulfur lanosterol and disulfur linoleic acid in molecular proportions at a temperature ranging from 130° to 170° C. It has the consistency of butter and is a little darker in color than the product obtained in Example 20, above.

EXAMPLE 22

*Monosulfur agnosterol monosulfur linolenate*

This compound is prepared by reacting monosulfur agnosterol and monosulfur linolenic acid in molecular proportions at a temperature ranging from 130° to 150° C. The compound has the consistency of the product obtained in Example 20, above, and about the same color.

EXAMPLE 23

*Disulfur agnosterol disulfur linolenate*

This compound is prepared in a similar manner as in Example 22, above, using disulfur agnosterol and disulfur linolenic acid in place of the mono-forms of this sterol and acid. It has a slightly darker color than the compound obtained in Example 22 and has about the same consistency.

EXAMPLE 24

*Trisulfur agnosterol trisulfur linolenate*

This compound is prepared by reacting trisulfurized agnosterol and trisulfurized linolenic acid in molecular proportions at a temperature ranging from 130° to 170° C. It has the consistency of hard butter and is somewhat deeper in color than the compound obtained in Example 23, above.

EXAMPLE 25

*Monosulfur ergosterol disulfur linoleate*

This compound is prepared by reacting monosulfur ergosterol and disulfur linoleic acid in molecular proportions at a temperature ranging from 130° to 150° C. It has the consistency of butter and has a yellowish red color.

EXAMPLE 26

*Disulfur ergosterol monosulfur oleate*

This compound is prepared by reacting disulfur ergosterol and sulfurized oleic acid in molecular proportions at a temperature ranging from 130° to 150° C. It has a consistency of butter and is a reddish yellow product.

All of the esters prepared were not chemically pure as the sterols and acids used were of commercial grade and it was difficult to purify them. For this reason the melting point of the ester when given is only approximate.

After preparation of the various compounds, they were washed with ethyl or isopropyl alcohol to remove any unreacted acid, and then dried by heating in an electric oven at a temperature sufficiently high to remove all traces of alcohol. The sulfur contents of the sulfurized sterols and acids were fairly close to the theoretical values. Catalyst other than iodine may be used in sulfurizing the sterol and acid giving a somewhat lighter colored product.

I claim:

1. A process comprising esterifying a compound selected from the group consisting of the sterols cholesterol, sistosterol, dihydrolanosterol, 7-dehydrocholesterol, dihydroagnosterol, stigmasterol, lanosterol, ergosterol, and agnosterol, and these said sterols in which the double bond at the 5:6 position of cholesterol, the 5:6 position of sitosterol, the 8:9 position of dihydrolanosterol, the 7:8 position of 7-dehydrocholesterol, the 7:8 and 5:6 positions of 7-dehydrocholesterol, the 9:11 position of dihydroagnosterol, the 9:11 and 7:8 positions of dihydroagnosterol, the 22:23 position of stigmasterol, the 22:23 and 5:6 positions of stigmasterol, the 24:25 position of lanosterol, the 24:25 and 8:9 positions of lanosterol, the 22:23 position of ergosterol, the 22:23 and 7:8 positions of ergosterol, the 22:23, 7:8, and 5:6 positions of ergosterol, the 24:25 position of agnosterol, the 24:25 and 9:11 positions of agnosterol, and the 24:25, 9:11, and 7:8 positions of agnosterol, have each been saturated with sulfur forming a thiirane group of the formula

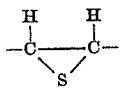

in which formula each carbon atom remains connected to the same adjacent carbon atom to which it was connected prior to the saturation with sulfur, with an acid selected from the group consisting of lauric acid, palmitic acid, stearic acid, benzoic acid, salicylic acid, oleic acid, ricinoleic acid, linoleic acid, linolenic acid, monosulfurized oleic acid of the formula

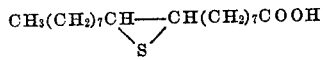

monosulfurized linoleic acid of the formula

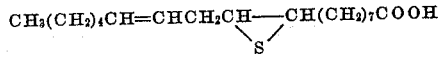

disulfurized linoleic acid of the formula

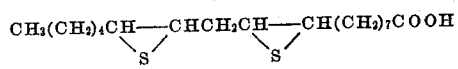

monosulfurized linolenic acid of the formula

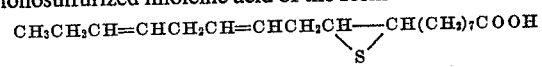

disulfurized linolenic acid of the formula

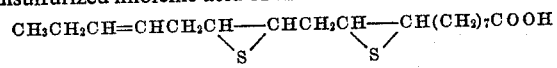

trisulfurized linolenic acid of the formula

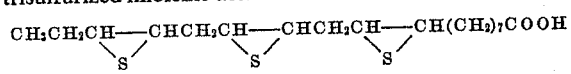

and monosulfurized ricinoleic acid of the formula

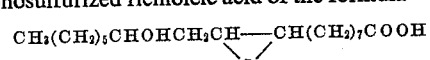

to produce the corresponding ester, the use of the first mentioned, non-sulfurized sterols requiring the corresponding use of one of the recited sulfurized acids.

2. A process comprising esterifying a compound selected from the group consisting of the sterols cholesterol, sistosterol, dihydrolanosterol, 7-dehydrocholesterol, dihydroagnosterol, stigmasterol, lanosterol, ergosterol, and agnosterol in which the double bond at the 5:6 position of the cholesterol, the 5:6 position of the sitosterol, the 8:9 position of the dihydrolanosterol, the 7:8 position of the 7-dehydrocholesterol, the 7:8 and 5:6 positions of the 7-dehydrocholesterol, the 9:11 position of the dihydroagnosterol, the 9:11 and 7:8 positions of the dihydroagnosterol, the 22:23 position of the stigmasterol, the 22:23 and 5:6 positions of the stigmasterol, the 24:25 position of the lanosterol, the 24:25 and 8:9 positions of the lanosterol, the 22:23 position of the ergosterol, the 22:23 and 7:8 positions of the ergostrol, the 22:23, 7:8, and 5:6 positions of thte ergosterol, the 24:25 position of the agnosterol, the 24:25 and 9:11 positions of the agnosterol, and the 24:25, 9:11, and 7:8 positions of the agnosterol, have each been saturated with sulfur forming a thiirane group of the formula

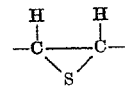

in which formula each carbon atom remains connected to the same adjacent carbon atom to which it was connected prior to the saturation with sulfur, with an acid selected from the group consisting of lauric acid, palmitic acid, stearic acid, benzoic acid, salicylic acid, oleic acid, ricinoleic acid, linoleic acid, linolenic acid, monosulfurized oleic acid of the formula

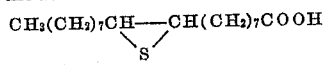

monosulfurized linoleic acid of the formula

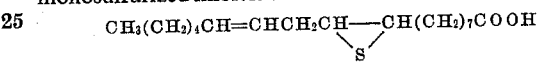

disulfurized linoleic acid of the formula

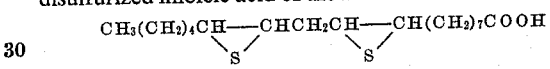

monosulfurized linolenic acid of the formula

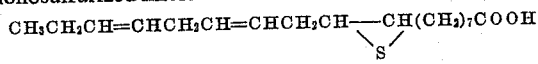

disulfurized linolenic acid of the formula

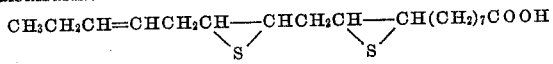

trisulfurized linolenic acid of the formula

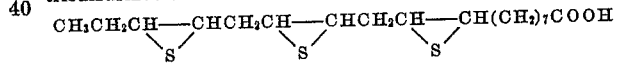

and monosulfurized ricinoleic acid of the formula

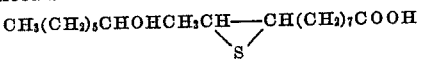

to produce the corresponding ester.

3. A process comprising esterifying cholesterol in which the double bond at the 5:6 position has been saturated with sulfur forming a thirrane group of the formula

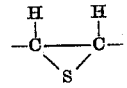

in which formula each carbon atom remains connected to the same adjacent carbon atom to which it was connected prior to the saturation with sulfur, with sulfurized oleic acid having the formula

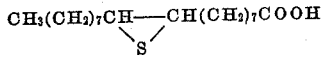

to produce the corresponding ester.

References Cited in the file of this patent

UNITED STATES PATENTS

| | | |
|---|---|---|
| 2,260,953 | Rebold | Oct. 28, 1941 |
| 2,326,936 | Fiedler et al. | Aug. 17, 1943 |

OTHER REFERENCES

Biochemische Zeitschrift, vol. 220 (1930), page 309, and 314–21.